United States Patent
Uchimura (10) Patent No.: US 10,970,609 B2
(45) Date of Patent: Apr. 6, 2021

(54) TAG MANAGEMENT DEVICE, TAG MANAGEMENT METHOD, AND PROGRAM

(71) Applicant: NEC CORPORATION, Tokyo (JP)

(72) Inventor: Jun Uchimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/327,977

(22) PCT Filed: Apr. 5, 2017

(86) PCT No.: PCT/JP2017/014254
§ 371 (c)(1),
(2) Date: Feb. 25, 2019

(87) PCT Pub. No.: WO2018/042744
PCT Pub. Date: Mar. 8, 2018

(65) Prior Publication Data
US 2019/0188549 A1 Jun. 20, 2019

(30) Foreign Application Priority Data
Aug. 29, 2016 (JP) .............................. JP2016-166645

(51) Int. Cl.
*G06K 19/07* (2006.01)
*G06Q 10/08* (2012.01)
*G06Q 30/00* (2012.01)
*G06K 7/10* (2006.01)

(52) U.S. Cl.
CPC ......... *G06K 19/0723* (2013.01); *G06Q 10/08* (2013.01); *G06Q 30/0185* (2013.01); *G06K 7/10* (2013.01)

(58) Field of Classification Search
CPC ........ G06K 19/00; G06K 19/04; G06K 19/06; G06K 19/07
USPC ................................. 235/492, 380, 375, 487
See application file for complete search history.

(56) References Cited

U.S. PATENT DOCUMENTS

| | | | |
|---|---|---|---|
| 8,138,922 B2* | 3/2012 | Lindsay | G06K 19/0716 340/539.26 |
| 2006/0145817 A1* | 7/2006 | Aikawa | G06K 7/0008 340/10.3 |
| 2007/0046473 A1* | 3/2007 | Kato | G06K 7/10336 340/572.1 |

(Continued)

FOREIGN PATENT DOCUMENTS

| JP | 2005-132576 A | 5/2005 |
|---|---|---|
| JP | 2005-225497 A | 8/2005 |

(Continued)

OTHER PUBLICATIONS

International Search Report of PCT/JP2017/014254 dated Jun. 6, 2017 [PCT/ISA/210].

(Continued)

*Primary Examiner* — Edwyn Labaze
(74) *Attorney, Agent, or Firm* — Sughrue Mion, PLLC (57) ABSTRACT

A tag management device includes a signal detecting unit configured to detect signals which are emitted from an old RFID tag and a new RFID tag, a comparison unit configured to compare the signals emitted from the old RFID tag and the new RFID tag, and a comparison result output unit configured to output a result of the comparison.

6 Claims, 6 Drawing Sheets

(56) References Cited

U.S. PATENT DOCUMENTS

2009/0012667 A1* 1/2009 Matsumoto .......... G05D 1/0261
                                                    701/26
2017/0019754 A1* 1/2017 Wilkinson ........... H04B 5/0031
2020/0234098 A1* 7/2020 Volkerink ............... B32B 37/06

FOREIGN PATENT DOCUMENTS

| JP | 2007-011838 A | 1/2007 |
| JP | 2007-334703 A | 12/2007 |
| JP | 2008-186119 A | 8/2008 |
| JP | 2013-519160 A | 5/2013 |
| JP | 2014-085690 A | 5/2014 |

OTHER PUBLICATIONS

IN Office Action for IN Application No. 201917007295 dated Jan. 25, 2021.

* cited by examiner

TAG MANAGEMENT DEVICE, TAG MANAGEMENT METHOD, AND PROGRAM

CROSS REFERENCE TO RELATED APPLICATIONS

This application is a National Stage of International Application No. PCT/JP2017/014254, filed Apr. 5, 2017, claiming priority to Japanese Patent Application No. 2016-166645, filed Aug. 29, 2016, the contents of all of which are incorporated herein by reference in their entirety.

TECHNICAL FIELD

The present invention relates to a tag management device, a tag management method, and a program.

BACKGROUND ART

A radio frequency identifier (RFID) tag in which identification (ID) information is recorded may be attached to a management object such as a container in order to manage the management object. When a management object is a container, an RFID tag is attached to the management object for a long time. Therefore, attachment and management of a new RFID tag due to aging degradation or the like has been considered or has been already realized. Techniques using an RFID tag are disclosed in Patent Documents 1 and 2.

CITATION LIST

Patent Literature

[Patent Document 1]
Japanese Unexamined Patent Application, First Publication No. 2007-334703
[Patent Document 2]
Published Japanese Translation No. 2013-519160 of the PCT International Publication

SUMMARY OF INVENTION

Problem to be Solved by the Invention

When a new RFID tag is attached to a management object due to aging degradation or the like of an RFID tag already attached to the management object, IDs recorded in the old RFID tag attached to the management object and the new RFID tag need to coincide with each other. However, an ID recorded in an RFID tag cannot be ascertained when there is no description on the tag. It is necessary to accurately ascertain that a new RFID tag in which an ID coinciding with an ID recorded in an old RFID tag has been recorded is attached to the management object.

Therefore, an objective of the present invention is to provide a tag management device, a tag management method, and a program that can solve the above-mentioned problem.

Means for Solving the Problem

A tag management device according to a first aspect of the invention includes a signal detecting unit configured to detect signals which are emitted from an old RFID tag and a new RFID tag, a comparison unit configured to compare the signals emitted from the old RFID tag and the new RFID tag, and a comparison result output unit configured to output a result of the comparison.

A tag management device according to a second aspect of the invention includes a signal detecting unit configured to detect a signal which is emitted from an RFID tag, a comparison unit configured to compare the signals which are sequentially detected and are emitted from the RFID tag, and a comparison result output unit configured to output a result of the comparison.

A tag management method according to a third aspect of the invention includes detecting signals which are emitted from an old RFID tag and a new RFID tag, comparing the signals emitted from the old RFID tag and the new RFID tag, and outputting a result of the comparison.

A program according to a fourth aspect of the invention causes a computer of a tag management device to perform a process, and the process includes detecting signals which are emitted from an old RFID tag and a new RFID tag, comparing the signals emitted from the old RFID tag and the new RFID tag, and outputting a result of the comparison.

Advantageous Effects of Invention

According to the invention, it is possible to easily find a new RFID tag in which an ID coinciding with an ID recorded in an old RFID tag has been recorded. According to the invention, it is possible to easily ascertain whether an ID recorded in an old RFID tag attached to a management object and an ID recorded in a new RFID tag coincide with each other and to prevent erroneous attachment of a new RFID tag in which the same ID as an ID recorded in an old RFID has been recorded.

DESCRIPTION OF EMBODIMENTS

First Embodiment

Figure 1:
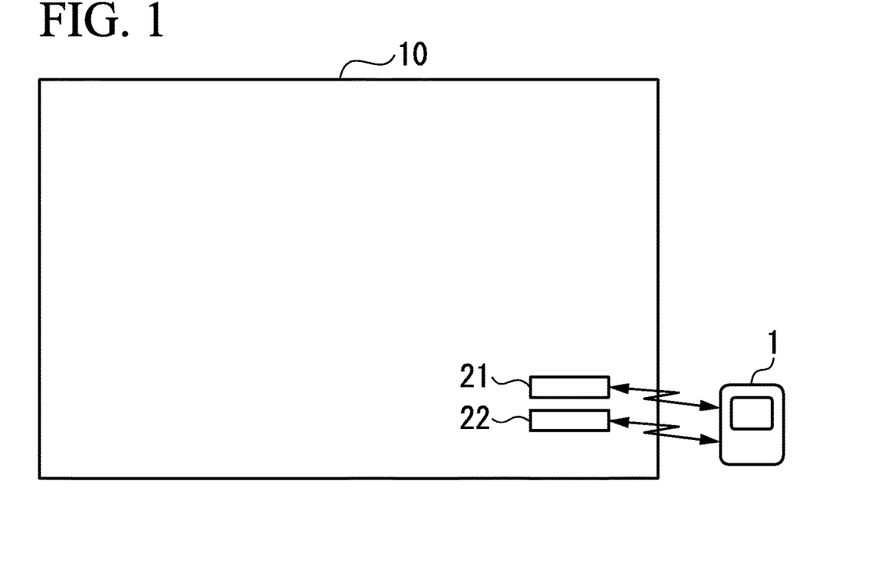
FIG. 1 is a diagram showing a tag management system according to an embodiment of the invention.

Hereinafter, a tag management device according to a first embodiment of the invention will be described with reference to the accompanying drawings.
FIG. 1 is a diagram showing a tag management system including an RFID tag and a tag management device according to the first embodiment.

As shown in the drawing, an old RFID tag 21 and a new RFID tag 22 are attached to a management object 10. When the management object 10 is a container, an ID for uniquely identifying the container needs to be recorded in the old RFID tag 21 or the new RFID tag 22. Accordingly, in a management of one container, management of a container can be continuously performed with IDs that match before and after the new RFID tag 22 is attached to the container. That is, an ID recorded in the old RFID tag 21 and an ID recorded in the new RFID tag 22 have to coincide with each other. The same ID as the ID recorded in the old RFID tag may be already recorded in the new RFID tag 22 in an operation of a tag manufacturer or the like. Alternatively, a manager of the management object 10 may record the same ID as the ID recorded in the old RFID tag 21 in the new RFID tag 22. When there are many management objects 10, new RFID tags 22 corresponding to the management objects 10 are manufactured and IDs of the management objects 10 are recorded in the new RFID tags 22. A manager of the management objects 10 finds one new RFID tag 22 in which an ID for uniquely identifying one management object 10 is recorded from a plurality of new RFID tags 22 and attaches the found new RFID tag to the management object 10. Alternatively, when a new RFID tag 22 is already attached to a management object 10, a manager of the management object 10 checks whether the new RFID tag 22 in which an ID coinciding with the ID of the old RFID tag 21 attached near the new RFID tag has been recorded is attached to the management object normally.

Figure 2:
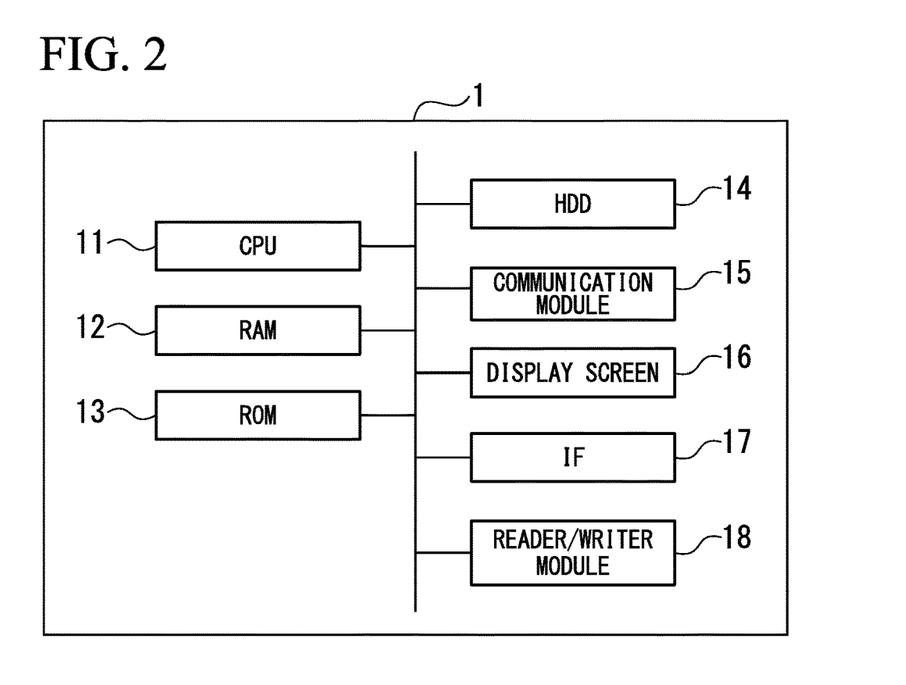
FIG. 2 is a diagram showing a hardware configuration of a tag management device according to an embodiment of the invention.

FIG. 2 is a diagram showing a hardware configuration of a tag management device.

A tag management device 1 includes hardware such as a central processing unit (CPU) 11, a random access memory (RAM) 12, a read only memory (ROM) 13, a hard disk drive (HDD) 14, a communication module 15, a display screen 16, an interface (IF) 17, and a reader/writer module 18. The reader/writer module 18 is hardware that can write information such as the IDs to each of the old RFID tag 21 and the new RFID tag 22 and read the information from each of the old RFID tag 21 and the new RFID tag 22, and includes an antenna or the like. The reader/writer module 18 may read and write information from and to the old RFID tag 21 and the new RFID tag 22 using signals with different frequencies and may read and write therefrom and thereto using signals with the same frequency. When the reader/writer module 18 has a function of reading and writing information from and to the old RFID tag 21 and the new RFID tag 22 using signals with different frequencies, the reader/writer module 18 includes antennas corresponding to the frequencies (a first RFID antenna and a second RFID antenna). In this embodiment, it is assumed that the reader/writer module 18 is hardware that reads and writes information from and to the old RFID tag 21 and the new RFID tag 22 using signals with different frequencies.

Figure 3:
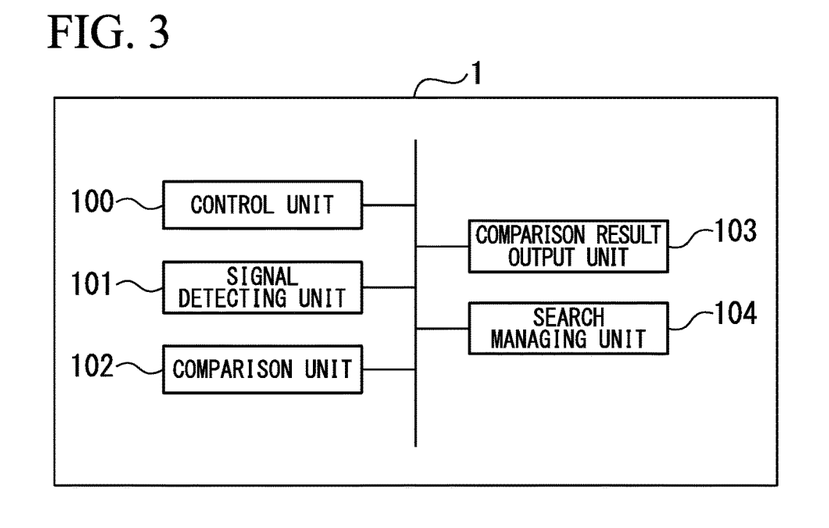
FIG. 3 is a functional block diagram of the tag management device according to the embodiment of the invention.

FIG. 3 is a block diagram showing the tag management device.

In the tag management device 1, the CPU 11 executes a tag management program which is recorded in the HDD 14 or the like. By executing the program, functional units such as a control unit 100, a signal detecting unit 101, a comparison unit 102, a comparison result output unit 103, and a search managing unit 104 are implemented in the tag management device 1.

The control unit 100 controls the other processing units 101 to 104.

The signal detecting unit 101 detects signals which are emitted from the old RFID tag 21 and the new RFID tag 22.

The comparison unit 102 compares the signals emitted from the old RFID tag 21 and the new RFID tag 22.

The comparison result output unit 103 outputs results of the comparison between the signals received from the old RFID tag 21 and the new RFID tag 22.

The search managing unit 104 starts a search mode process for the new RFID tag 22 when it is determined from the result of the comparison by the comparison unit 102 that the signals do not coincide with each other. The search mode process is a process of searching for a new RFID tag 22 of which an ID (a signal) coincides with the ID of the old RFID tag 21.

Figure 4:
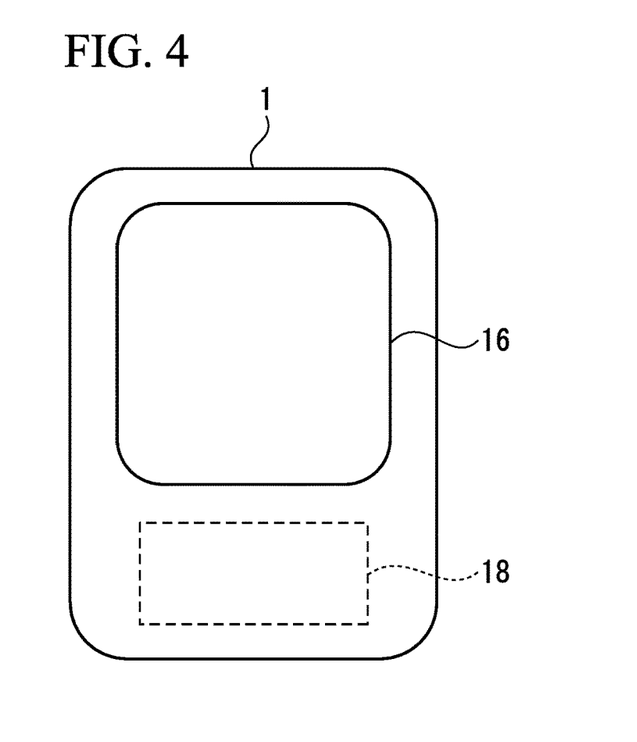
FIG. 4 is an outline view of the tag management device according to the embodiment of the invention.

FIG. 4 is an outline view of the tag management device.

In the tag management device 1, the display screen 16 is provided in a box-shaped housing, for example, as shown in FIG. 4. The display screen 16 has, for example, a function of a touch panel sensor, displays information, and receives information by detecting a user's operation with the user's finger or the like. The input of information is controlled by the interface (IF) 17, and the IF 17 outputs the input information to the CPU 11 or the like. The tag management device 1 includes the reader/writer module 18, and antennas corresponding to an old RFID tag 21 and a new RFID tag 22 are incorporated into the reader/writer module 18.

Figure 5:
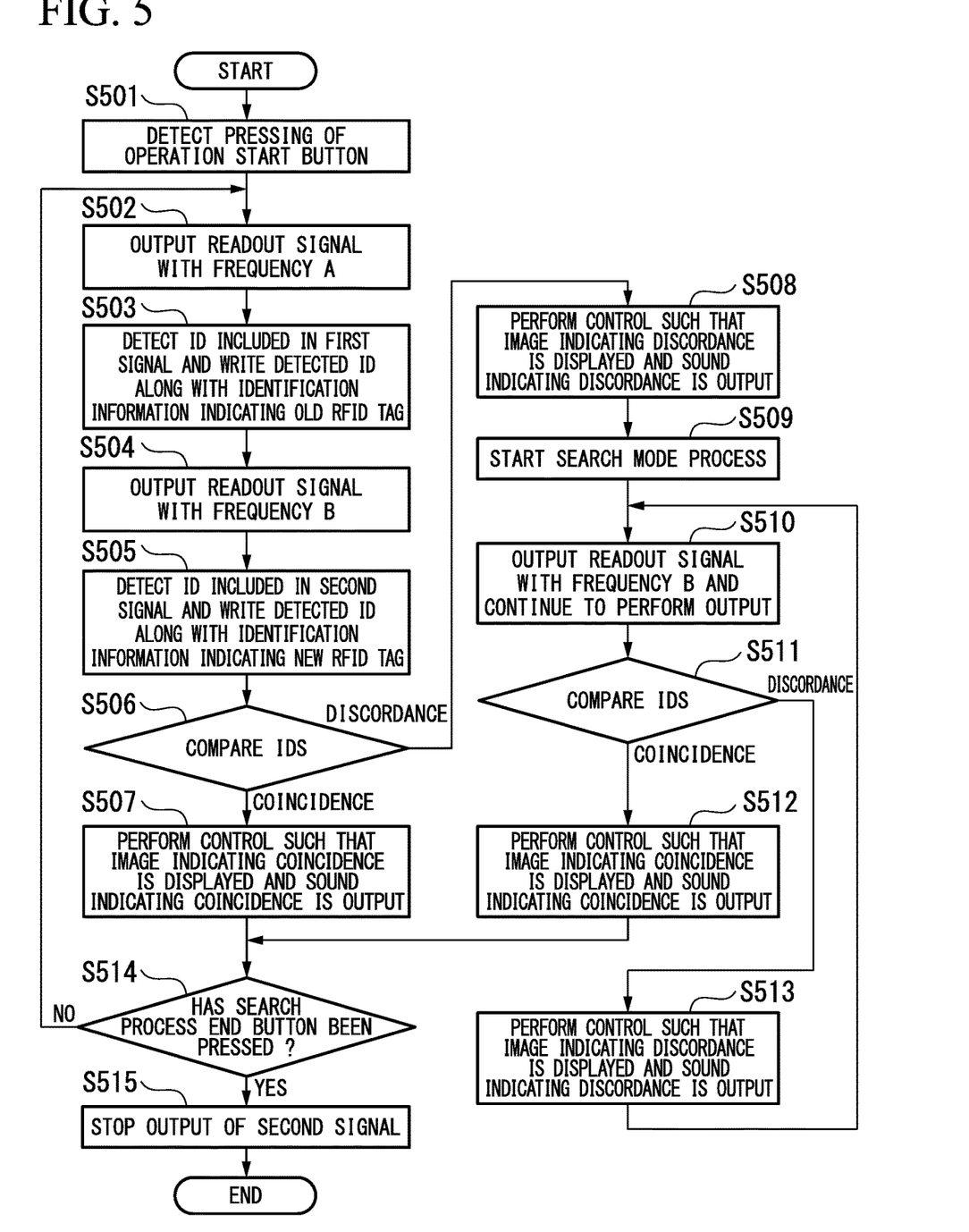
FIG. 5 is a flowchart showing a process flow in a tag management device according to a first embodiment of the invention.

FIG. 5 is a flowchart showing a process flow in the tag management device according to a first embodiment.

The process flow in the tag management device 1 will be sequentially described below.

A user who uses the tag management device 1 such as a manager of a management object 10 turns on a power supply of the tag management device 1 and causes the tag management device 1 to operate. Then, the CPU 11 of the tag management device 1 starts a tag management program. Accordingly, the tag management device 1 has functions of the processing units 100 to 104 shown in FIG. 3. An old RFID tag 21 and a new RFID tag 22 are already attached to the management object 10 (a container) in parallel. The old RFID tag 21 has been attached, for example, several years ago and has undergone aging degradation. The new RFID tag 22 is an RFID tag which is newly attached as an RFID tag corresponding to the old RFID tag 21. The old RFID tag 21 is a tag which was attached to the management object 10 before the new RFID tag 22. In other words, the new RFID tag 22 is a tag of which a use period is shorter than that of the old RFID tag 21 or is an unused RFID tag. An operation start button is displayed in an image which is displayed on the display screen 16. In this state, the user presses the operation start button displayed on the display screen 16. The control unit 100 of the tag management device 1 detects pressing of the operation start button (Step S501).

When pressing of the operation start button has been detected, the control unit 100 of the tag management device 1 outputs an instruction to read an old RFID tag to the reader/writer module 18. Then, the first RFID antenna of the reader/writer module 18 outputs a readout signal for reading out information from the old RFID tag 21 with frequency A (Step S502). The old RFID tag 21 receives the readout signal and emits a first signal including an ID. The first RFID antenna receives the first signal including the ID and outputs the received first signal to the CPU 11. The signal detecting unit 101 which is a functional unit implemented in the CPU 11 detects the ID included in the first signal and writes the detected ID to the RAM 12 along with identification information indicating that the detected ID is the old RFID tag 21 (Step S503). At this time, the control unit 100 may perform control such that first notification information (sound or display information) is output to notify the user that the first signal has been received and the ID has been detected.

When the signal detecting unit 101 detects the ID included in the first signal, the control unit 100 then outputs an instruction to read a new RFID tag to the reader/writer module 18. The second RFID antenna of the reader/writer module 18 outputs a readout signal for reading information from the new RFID tag 22 with frequency B (Step S504). The new RFID tag 22 receives the readout signal and emits a second signal including an ID. The second RFID antenna receives the second signal including the ID and outputs the received second signal to the CPU 11. The signal detecting unit 101 detects the ID included in the second signal and writes the ID to the RAM 12 along with identification information indicating that the ID is the new RFID tag 22 (Step S505). At this time, the control unit 100 may perform control such that second notification information (sound or display information) is output to notify the user that the second signal has been received and the ID has been detected. The first notification information and the second notification information may be information for outputting different sounds such that the user can distinguish the first notification information and the second notification information from each other. Accordingly, the user can ascertain that the IDs of both the old RFID tag 21 and the new RFID tag 22 have been read normally.

When the IDs of both the old RFID tag 21 and the new RFID tag 22 are written to the RAM 12, the control unit 100 outputs a comparison instruction to the comparison unit 102. The comparison unit 102 compares the IDs written to the RAM 12 (Step S506). The comparison unit 102 outputs information indicating coincidence or discordance which is the result of the comparison to the comparison result output unit 103. When information indicating coincidence has been acquired, the comparison result output unit 103 performs control such that an image indicating coincidence is displayed on the display screen 16 and sound indicating coincidence is output from a speaker (Step S507). When information indicating discordance has been acquired, the comparison result output unit 103 performs control such that an image indicating discordance is displayed on the display screen 16 and sound indicating discordance is output from the speaker (Step S508).

When the result of comparison indicates discordance, the comparison unit 102 instructs the search managing unit 104 to start a process. When information indicating discordance is input from the comparison unit 102, the search managing unit 104 starts a search mode process for a new RFID tag 22 (Step S509). The search managing unit 104 searches for a new RFID tag 22 of which an ID (a signal) coincides with that of the old RFID tag 21. The search managing unit 104 starts a process of detecting a signal emitted from a new RFID tag 22. Specifically, the search managing unit 104 instructs the reader/writer module 18 to continue to output an instruction to read a new RFID tag. The second RFID antenna of the reader/writer module 18 outputs, with frequency B, a readout signal for reading information from a new RFID tag 22 and continues to perform the output (Step S510). That is, the reader/writer module 18 outputs, with a predetermined frequency, a readout signal to instruct the new RFID tag 22 to emit a signal.

The user takes out one new RFID tag from many new RFID tags 22 stored in a box or the like and holds the new RFID tag over the reader/writer module 18. Then, the new RFID tag 22 taken out by the user receives a readout signal and emits a second signal including an ID. The second RFID antenna receives the second signal including the ID and outputs the received second signal to the CPU 11. The search managing unit 104 detects the ID included in the second signal and compares the ID with an ID which has already been registered in the RAM 12 in correlation with identification information of the old RFID tag 21 (Step S511). When the two IDs coincide with each other, the search managing unit 104 determines that the new RFID tag 22 taken out of the box by the user is a tag in which the same ID as the ID stored in the old RFID tag 21 attached to the management object 10 is recorded. When the two IDs coincide with each other, the search managing unit 104 performs control such that an image indicating coincidence is displayed on the display screen 16 and sound indicating coincidence is output from the speaker (Step S512). That is, the search managing unit 104 outputs a search success notification. When an image or sound indicating coincidence is output, the user recognizes the new RFID tag 22 taken out of the box as a correct new RFID tag 22 in which the same ID as the old RFID tag 21 attached to the management object 10 is recorded. Then, the user detaches the new RFID tag 22 which is currently attached in parallel to the old RFID tag 21 and attaches the correct new RFID tag 22 in parallel to the old RFID tag 21.

When the two IDs do not coincide with each other, the search managing unit 104 performs control such that an image indicating discordance is displayed on the display screen 16 and sound indicating discordance is output from the speaker (Step S513). The search managing unit 104 newly detects an ID included in a second signal and repeats the processes from Step S510. A search process end button is displayed on the display screen 16. The search managing unit 104 determines whether the search process end button has been pressed (Step S514). When the search process end button has been pressed (YES in Step S514), the search managing unit 104 ends the search mode process. The search managing unit 104 instructs the reader/writer module 18 to end output of the instruction to read a new RFID tag. Accordingly, the second RFID antenna stops outputting the second signal (Step S515). When the search process end button has not been pressed (NO in Step S514), the processes from Step S502 are repeated.

In the process flow which is performed by the tag management device 1 according to the first embodiment, IDs of an old RFID tag 21 and a new RFID tag 22 which are attached to the management object 10 are automatically read. When the two IDs do not coincide with each other, reading of an ID of another new RFID tag 22 is immediately started. A user can ascertain whether the ID recorded in another new RFID tag 22 coincides with that of the old RFID tag 21 by simply holding another new RFID tag 22 over the tag management device 1.

Accordingly, it is possible to easily find a new RFID tag 22 in which the same ID as the ID recorded in the old RFID tag 21 is recorded. It is also possible to easily ascertain whether the ID recorded in the new RFID tag 22 coincides with the ID recorded in the old RFID tag 21 and to prevent erroneous attachment of a new RFID tag 22 in which the same ID as the ID recorded in the old RFID tag 21 is recorded.

Second Embodiment

Figure 6:
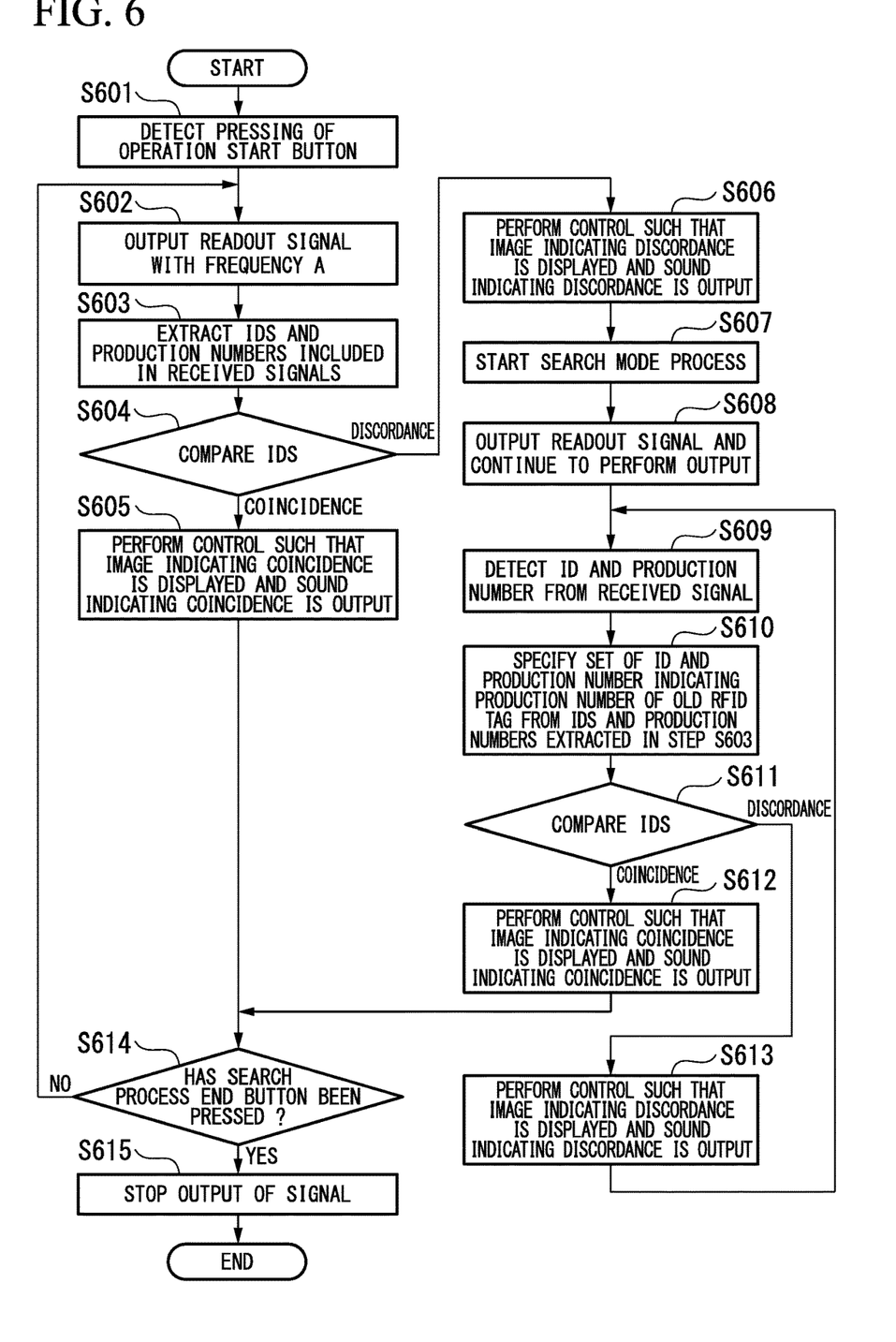
FIG. 6 is a flowchart showing a process flow in a tag management device according to a second embodiment of the invention.

FIG. 6 is a flowchart showing a process flow in a tag management device according to a second embodiment.

A process flow which is performed by the tag management device 1 according to the second embodiment will be described below. The tag management device 1 according to the second embodiment is different from the tag management device 1 according to the first embodiment in processes.

The second embodiment is an example in which frequencies of readout signals which are read from an old RFID tag 21 and a new RFID tag 22 are equal to each other.

In this case, a user who uses the tag management device 1 such as a manager of a management object 10 operates the tag management device 1. Then, the CPU 11 of the tag management device 1 starts a tag management program.

Accordingly, the tag management device 1 has the functions of the processing units 100 to 104 shown in FIG. 3. An old RFID tag 21 and a new RFID tag 22 are already attached to a container in parallel. The old RFID tag 21 has been attached, for example, several years ago and has undergone aging degradation. The new RFID tag 22 is an RFID tag which is newly attached as an RFID tag corresponding to the old RFID tag 21. An operation start button is displayed on an image which is displayed on the display screen 16. In this state, the user presses the operation start button displayed on the display screen 16. The control unit 100 of the tag management device 1 detects pressing of the operation start button (Step S601).

When pressing of the operation start button has been detected, the control unit 100 of the tag management device 1 outputs an instruction to read an RFID tag to the reader/writer module 18. Then, the RFID antenna of the reader/writer module 18 outputs, with frequency A, a readout signal for reading out information from the old RFID tag 21 and the new RFID tag 22 (Step S602). By outputting the readout signal with frequency A a plurality of times, the reader/writer module 18 receives signals including an ID from the old RFID tag 21 and the new RFID tag 22 which emit signals in response to reception of the readout signal. Even when a collision occurs between the signal emitted from the old RFID tag 21 and the signal emitted from the new RFID tag 22, the collision can be prevented by a known technique.

The old RFID tag 21 and the new RFID tag 22 receive the readout signal and emit signals including an ID and a production number of the RFID tag. The RFID antenna receives the signals (signals including the ID and the production number) emitted from the old RFID tag 21 and the new RFID tag 22 and outputs the received signals to the CPU 11 at different times. The signal detecting unit 101 of the CPU 11 extracts the ID and the production number of the RFID tag included in each signal (Step S603). The signal detecting unit 101 outputs two sets of the ID and the production number to the comparison unit 102. The comparison unit 102 compares the IDs (Step S604). The comparison unit 102 outputs information indicating coincidence or discordance which is a result of the comparison to the comparison result output unit 103. When information indicating coincidence has been acquired, the comparison result output unit 103 performs control such that an image indicating coincidence is displayed on the display screen 16 and sound indicating coincidence is output from the speaker (Step S605). When information indicating discordance has been acquired, the comparison result output unit 103 performs control such that an image indicating discordance is displayed on the display screen 16 and sound indicating discordance is output from the speaker (Step S606).

When the result of comparison indicates discordance, the comparison unit 102 instructs the search managing unit 104 to process. When information indicating discordance is input from the comparison unit 102, the search managing unit 104 starts the search mode process for a new RFID tag 22 (Step S607). The search managing unit 104 searches for a new RFID tag 22 of which an ID (a signal) coincides with that of the old RFID tag 21. The search managing unit 104 starts a process of detecting a signal emitted from a new RFID tag 22. Specifically, the search managing unit 104 instructs the reader/writer module 18 to continue to output an instruction to read a new RFID tag. The RFID antenna of the reader/writer module 18 outputs a readout signal and continues to perform the output (Step S608). That is, the reader/writer module 18 outputs, with a predetermined frequency, a readout signal that instructs the new RFID tag 22 to emit a signal.

The user takes out one new RFID tag from many new RFID tags 22 stored in a box or the like and holds the new RFID tag over the reader/writer module 18. Then, the new RFID tag 22 taken out by the user receives a readout signal and emits a signal including an ID and a production number. The RFID antenna receives the signal including the ID and the production number and outputs the received signal to the CPU 11. The search managing unit 104 detects the ID and the production number included in the signal (Step S609). The search managing unit 104 specifies a set of an ID and a production number indicating the production number of the old RFID tag 21 from the IDs and the production numbers extracted in Step S603 (Step S610). It is assumed that the production number of the old RFID tag 21 is known to the tag management device 1. Accordingly, the search managing unit 104 can specify a set of an ID and a production number emitted from the old RFID tag 21 on the basis of the production number. The search managing unit 104 compares the ID of the new RFID tag 22 detected in Step S609 with the ID of the old RFID tag 21 specified in Step S610 (Step S611). When the two IDs coincide with each other, the search managing unit 104 determines that the new RFID tag 22 taken out of the box by the user is a tag in which the same ID as the ID stored in the old RFID tag 21 attached to the management object 10 is recorded. When the two IDs coincide with each other, the search managing unit 104 performs control such that an image indicating coincidence is displayed on the display screen 16 and sound indicating coincidence is output from the speaker (Step S612). That is, the search managing unit 104 outputs a search success notification. When an image or sound indicating coincidence is output, the user recognizes the new RFID tag 22 taken out of the box as a correct new RFID tag 22 in which the same ID as the old RFID tag 21 attached to the management object 10 is recorded. Then, the user detaches the new RFID tag 22 which is currently attached in parallel to the old RFID tag 21 and attaches the correct new RFID tag 22 in parallel to the old RFID tag 21.

When the two IDs do not coincide with each other, the search managing unit 104 performs control such that an image indicating discordance is displayed on the display screen 16 and sound indicating discordance is output from the speaker (Step S613). The search managing unit 104 newly detects an ID and a production number included in a signal and repeats the processes from Step S609. A search process end button is displayed on the display screen 16. The search managing unit 104 determines whether the search process end button has been pressed (Step S614). When the search process end button has been pressed (YES in Step S614), the search managing unit 104 ends the search mode process. The search managing unit 104 instructs the reader/writer module 18 to end output of the instruction to read a new RFID tag. Accordingly, the second RFID antenna stops outputting the signal (Step S615). When the search process end button has not been pressed (NO in Step S614), the processes from Step S602 are repeated.

In the process flow which is performed by the tag management device 1 according to the second embodiment, IDs of an old RFID tag 21 and a new RFID tag 22 which are attached to a management object 10 are automatically read. When the two IDs do not coincide with each other, reading of an ID of another new RFID tag 22 is immediately started. A user can ascertain whether the ID recorded in another new RFID tag 22 coincides with that of the old RFID tag 21 by simply holding another new RFID tag 22 over the tag management device 1.

Accordingly, it is possible to easily find a new RFID tag 22 in which the same ID as the ID recorded in the old RFID tag 21 is recorded. It is also possible to easily ascertain whether the ID recorded in the new RFID tag 22 coincides with the ID recorded in the old RFID tag 21 and to prevent erroneous attachment of a new RFID tag 22 in which the same ID as the ID recorded in the old RFID tag 21 is recorded.

Third Embodiment

Figure 7:
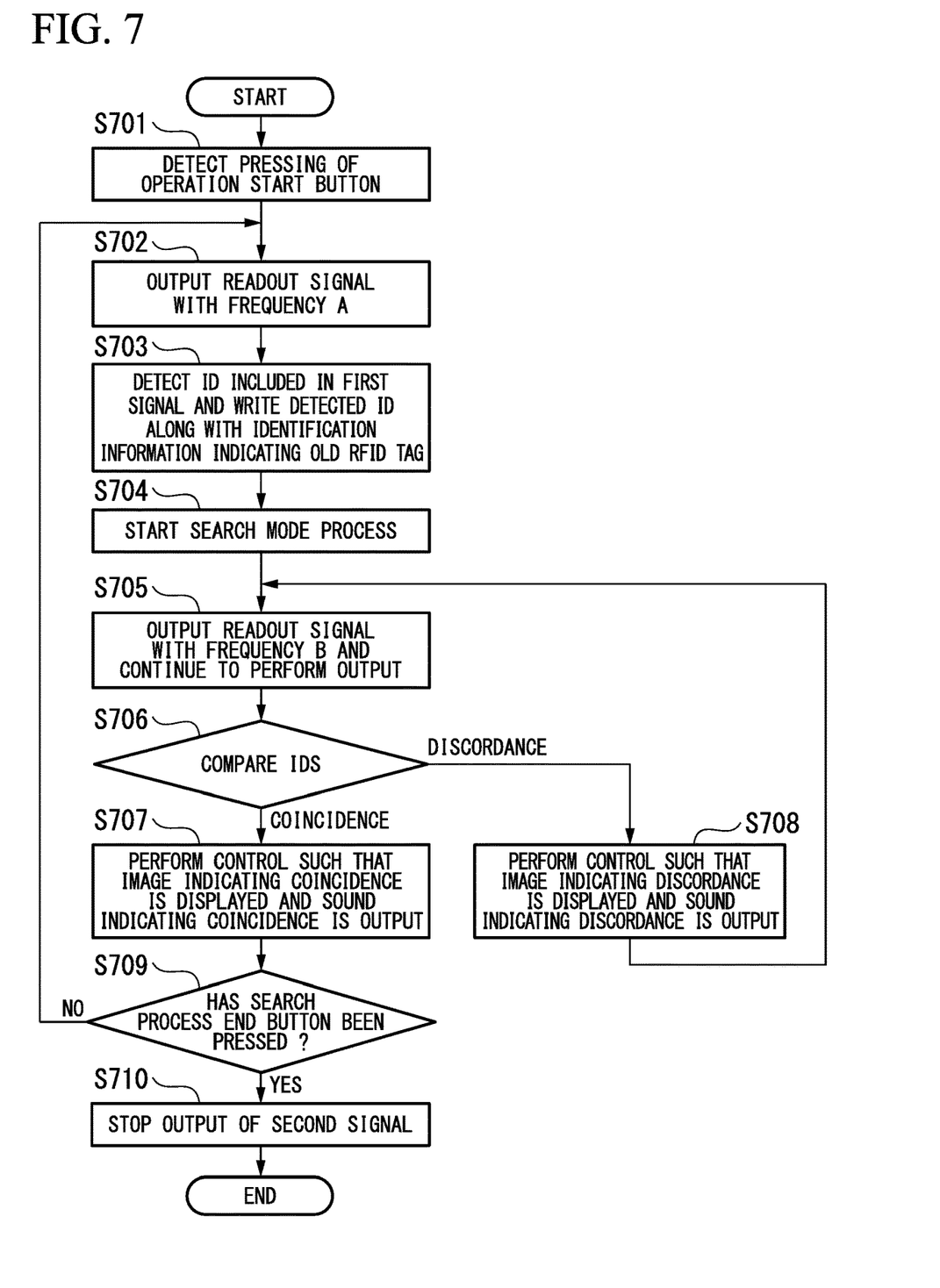
FIG. 7 is a flowchart showing a process flow in a tag management device according to a third embodiment of the invention.

FIG. 7 is a flowchart showing a process flow in a tag management device according to a third embodiment.

A process flow which is performed by the tag management device 1 according to the third embodiment will be described below. The tag management device 1 according to the third embodiment is different from the tag management device 1 according to the first embodiment in processes.

In the third embodiment, it is assumed that an old RFID tag 21 is attached to a management object 10 and a new RFID tag 22 is not yet attached thereto. In this state, a user selects a new RFID tag 22 of which an ID coincides with the ID stored in the old RFID tag 21 from a box in which many new RFID tags 22 are stored and attaches the selected new RFID tag 22 beside the old RFID tag 21.

In this embodiment, a user who uses the tag management device 1 such as a manager of a management object 10 causes the tag management device 1 to operate. Then, the CPU 11 of the tag management device 1 activates a tag management program. Accordingly, the tag management device 1 has the functions of the processing units 100 to 104 shown in FIG. 3. An old RFID tag 21 is already attached to a container. The old RFID tag 21 has been attached, for example, several years ago and has undergone aging degradation. An operation start button is displayed on an image which is displayed on the display screen 16. In this state, the user presses the operation start button displayed on the display screen 16. The control unit 100 of the tag management device 1 detects pressing of the operation start button (Step S701).

When pressing of the operation start button has been detected, the control unit 100 of the tag management device 1 outputs an instruction to read the old RFID tag to the reader/writer module 18. Then, the first RFID antenna of the reader/writer module 18 outputs a readout signal for reading out information from the old RFID tag 21 with frequency A (Step S702). The old RFID tag 21 receives the readout signal and emits a first signal including an ID. The first RFID antenna receives the first signal including an ID and outputs the first signal to the CPU 11. The signal detecting unit 101 of the CPU 11 detects the ID included in the first signal and writes the ID to the RAM 12 along with identification information indicating that the ID is the old RFID tag 21 (Step S703). At this time, the control unit 100 may perform control such that first notification information (sound or display information) for notifying the user that the first signal has been received and the ID has been detected is output.

When the first signal has been received and the ID has been detected, the control unit 100 instructs the search managing unit 104 to start processes. Then, the search managing unit 104 starts the search mode process for a new RFID tag 22 (Step S704). The search managing unit 104 searches for a new RFID tag 22 of which an ID (a signal) coincides with that of the old RFID tag 21. The search managing unit 104 starts a process of detecting a signal emitted from a new RFID tag 22. Specifically, the search managing unit 104 instructs the reader/writer module 18 to continue to output an instruction to read a new RFID tag. The second RFID antenna of the reader/writer module 18 outputs a readout signal for reading out information from the new RFID tag 22 with frequency B and continues to perform the output (Step S705). That is, the reader/writer module 18 outputs, with a predetermined frequency, a readout signal that instructs the new RFID tag 22 to emit a signal.

The user takes out one new RFID tag from many new RFID tags 22 stored in a box or the like and holds the new RFID tag over the reader/writer module 18. Then, the new RFID tag 22 taken out by the user receives a readout signal and emits a second signal including an ID. The second RFID antenna receives the second signal including the ID and outputs the received second signal to the CPU 11. The search managing unit 104 detects the ID included in the second signal and compares the detected ID with the ID which is already registered in the RAM 12 in correlation with the identification information of the old RFID tag 21 (Step S706). When the two IDs coincide with each other, the search managing unit 104 determines that the new RFID tag 22 taken out of the box by the user is a tag in which the same ID as the ID stored in the old RFID tag 21 attached to the management object 10 is recorded. When the two IDs coincide with each other, the search managing unit 104 performs control such that an image indicating coincidence is displayed on the display screen 16 and sound indicating coincidence is output from the speaker (Step S707). That is, the search managing unit 104 outputs a search success notification. When an image or sound indicating coincidence is output, the user recognizes the new RFID tag 22 taken out of the box as a correct new RFID tag 22 in which the same ID as the old RFID tag 21 attached to the management object 10 is recorded. Then, the user attaches the correct new RFID tag 22 in parallel to the old RFID tag 21.

When the two IDs do not coincide with each other, the search managing unit 104 performs control such that an image indicating discordance is displayed on the display screen 16 and sound indicating discordance is output from the speaker (Step S708). The search managing unit 104 newly detects an ID included in a second signal and repeats the processes from Step S705. A search process end button is displayed on the display screen 16. The search managing unit 104 determines whether the search process end button has been pressed (Step S709). When the search process end button has been pressed (YES in Step S709), the search managing unit 104 ends the search mode process. The search managing unit 104 instructs the reader/writer module 18 to end output of the instruction to read a new RFID tag. Accordingly, the second RFID antenna stops outputting the second signal (Step S710). When the search process end button has not been pressed (NO in Step S709), the processes from Step S702 are repeated.

With the process flow in the tag management device 1 according to the third embodiment, it is possible to easily find a new RFID tag 22 in which the same ID as an ID of an old RFID tag 21 attached to a management object 10 is stored.

Figure 8:
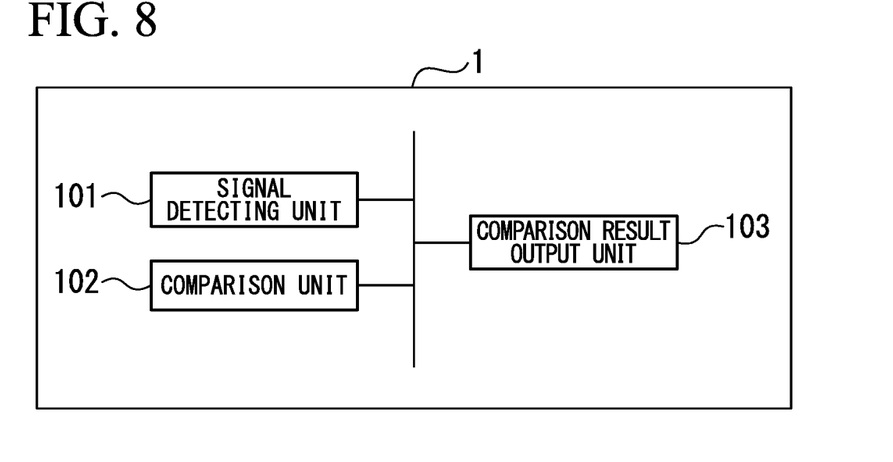
FIG. 8 is a diagram showing a minimum configuration of a tag management device according to the invention.

FIG. 8 is a diagram showing a minimum configuration of a tag management device.

As shown in the drawing, the tag management device 1 includes at least the signal detecting unit 101 that detects signals which are emitted from an old RFID tag 21 and a new RFID tag 22, the comparison unit 102 that compares the signals emitted from the old RFID tag 21 and the new RFID tag 22, and the comparison result output unit 103 that outputs results of the comparison.

The tag management device 1 has a computer system therein. The above-mentioned process steps are stored in the form of a program in a computer-readable recording medium, and the above-mentioned process steps are performed by causing a computer to read and execute the program. Here, examples of the computer-readable recording medium include a magnetic disk, a magneto-optical disc, a CD-ROM, a DVD-ROM, and a semiconductor memory. The computer program may be transmitted to a computer via a communication line and the computer having received the computer program may execute the program.

The program may be designed to realize some of the above-mentioned functions. The program may be a so-called differential file (a differential program) which can realize the above-mentioned functions in combination with a program which is already recorded in the computer system.

INDUSTRIAL APPLICABILITY

According to the invention, it is possible to easily find a new RFID tag in which an ID coinciding with an ID recorded in an old RFID tag has been recorded. According to the invention, it is possible to easily ascertain whether an ID recorded in an old RFID tag attached to a management object and an ID recorded in a new RFID tag coincide with each other and to prevent erroneous attachment of a new RFID tag in which the same ID as an ID recorded in an old RFID has been recorded.

REFERENCE SIGNS LIST

1 Tag management device
10 Management object
21 Old RFID tag
22 New RFID tag
11 CPU
12 RAM
13 ROM
14 HDD
15 Communication module
16 Display screen
17 IF
18 Read/writer module
100 Control unit
101 Signal detecting unit
102 Comparison unit
103 Comparison result output unit
104 Search managing unit

The invention claimed is:

1. A tag management device comprising:
an antenna configured to output a readout signal that instructs an old RFID tag and a new RFID tag to emit signals, and receive signals emitted in response to the readout signal from the old RFID tag and the new RFID tag;
a signal detecting unit configured to detect signals which are emitted from the old RFID tag and the new RFID tag;
a comparison unit configured to compare, as first comparison process, IDs included in the signals emitted from the old RFID tag and the new RFID tag;
a search managing unit configured to instruct, as a search mode process, the antenna to continue outputting the readout signal when the IDs included in signals emitted from the old RFID tag and the new RFID tag do not coincide as a result of the first comparison process, and compare repeatedly the ID included in the signal emitted from the old RFID tag used in the first comparison process and the ID included in the signal emitted from another new RFID tag, which is different from the new RFID tag that emitted the signal used in the first comparison process, in response to the readout signal output continuously, for the another new RFID tag that is different for each comparison; and
a comparison result output unit configured to output a result of the comparison.

2. The tag management device according to claim 1, wherein the search managing unit is configured to perform the search mode process of searching the another new RFID tag of which the signal coincides with the signal of the old RFID tag when it is determined from the comparison result by the comparison unit that the signals do not coincide with each other.

3. The tag management device according to claim 1, wherein the search managing unit is configured to output a search success notification when it is determined from the comparison result by the comparison unit that the IDs included in the signals coincide with each other.

4. The tag management device according to claim 1, wherein the search managing unit is configured to start a process of detecting the signal emitted from the another new RFID tag in the search mode process.

5. The tag management device according to claim 1, wherein the antenna is configured to output, with a predetermined frequency, the readout signal that instructs the another new RFID tag to emit the signal in the search mode process.

6. A tag management method comprising:
detecting signals which are emitted from an old RFID tag and a new RFID tag;
comparing, as first comparison process, IDs included in the signals emitted from the old RFID tag and the new RFID tag;
instructing an antenna, which outputs a readout signal that instructs the old RFID tag and the new RFID tag to emit signals and receives signals emitted in response to the readout signal from the old RFID tag and the new RFID tag, to continue outputting the readout signal as a search mode process, when the IDs included in signals emitted from the old RFID tag and the new RFID tag do not coincide as a result of the first comparison process,
comparing repeatedly the ID included in the signal emitted from the old RFID tag used in the first comparison process and the ID included in the signal emitted from another new RFID tag, which is different from the new RFID tag that emitted the signal used in the first comparison process, in response to the readout signal output continuously, for the another new RFID tag that is different for each comparison; and
outputting a result of the comparison.

* * * * *